(12) United States Patent
Weller et al.

(10) Patent No.: US 10,684,471 B2
(45) Date of Patent: Jun. 16, 2020

(54) VEHICLE DISPLAY COMPRISING FOCAL DISTANCE CORRECTION FEATURE

(71) Applicant: Gentex Corporation, Zeeland, MI (US)

(72) Inventors: Andrew D. Weller, Holland, MI (US); John A. VanderPloeg, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 320 days.

(21) Appl. No.: 15/496,340

(22) Filed: Apr. 25, 2017

(65) Prior Publication Data

US 2017/0315349 A1 Nov. 2, 2017

Related U.S. Application Data

(60) Provisional application No. 62/328,342, filed on Apr. 27, 2016.

(51) Int. Cl.
*G02B 27/02* (2006.01)
*G02B 27/01* (2006.01)
(Continued)

(52) U.S. Cl.
CPC ............ *G02B 27/0101* (2013.01); *B60R 1/04* (2013.01); *B60R 1/12* (2013.01); *G02B 5/04* (2013.01);
(Continued)

(58) Field of Classification Search
CPC .... G02B 25/002; G02B 25/02; G02B 25/005; G02B 25/008; G02B 27/027;
(Continued)

(56) References Cited

U.S. PATENT DOCUMENTS 5,037,182 A 8/1991 Groves et al.
5,469,298 A * 11/1995 Suman .................. G02B 27/01
296/37.7
(Continued)

FOREIGN PATENT DOCUMENTS

WO 98/42796 A1 10/1998
WO 99/02621 A1 1/1999

OTHER PUBLICATIONS

International Search Report and Written Opinion of the International Searching Authority, dated Aug. 8, 2017, for International Application No. PCT/US2017/029644 filed Apr. 26, 2017; 9 pages.

*Primary Examiner* — William R Alexander
*Assistant Examiner* — Tamara Y. Washington
(74) *Attorney, Agent, or Firm* — Price Heneveld LLP; Bradley D. Johnson (57) ABSTRACT

According to one aspect of the present disclosure, a display apparatus for a vehicle is disclosed. The apparatus comprises a display panel retained in a housing and configured to display image data on a display surface in a display direction. The apparatus further comprises a focal distance correction feature disposed in front of the display surface in the display direction. The focal distance correction feature is configured to project the image data at a projected distance behind the display surface relative to the display direction such that the image data appears to originate from behind the display surface.

17 Claims, 5 Drawing Sheets

(51) Int. Cl.
  *B60R 1/04* (2006.01)
  *B60R 1/12* (2006.01)
  *G02B 5/04* (2006.01)
  *H04N 5/225* (2006.01)
  *H04N 5/247* (2006.01)
  *H04N 5/232* (2006.01)

(52) U.S. Cl.
  CPC ....... *G02B 27/0149* (2013.01); *H04N 5/2252* (2013.01); *H04N 5/2254* (2013.01); *B60R 2001/1215* (2013.01); *B60R 2300/205* (2013.01); *B60R 2300/8026* (2013.01); *G02B 2027/0127* (2013.01); *G02B 2027/0159* (2013.01); *H04N 5/23238* (2013.01); *H04N 5/247* (2013.01)

(58) Field of Classification Search
  CPC .... G02B 27/025; G02B 27/028; G01N 21/87; G01N 2021/0339
  See application file for complete search history.

(56) References Cited

U.S. PATENT DOCUMENTS

| | | | |
|---|---|---|---|
| 5,928,572 A | 7/1999 | Tonar et al. | |
| 5,998,617 A | 12/1999 | Srinivasa et al. | |
| 6,020,987 A | 2/2000 | Baumann et al. | |
| 6,037,471 A | 3/2000 | Srinivasa et al. | |
| 6,137,620 A | 10/2000 | Guarr et al. | |
| 6,141,137 A | 10/2000 | Byker et al. | |
| 6,193,912 B1 | 2/2001 | Thieste et al. | |
| 6,249,369 B1 | 6/2001 | Theiste et al. | |
| 6,498,620 B2 | 12/2002 | Schofield et al. | |
| 6,572,233 B1 | 6/2003 | Northman et al. | |
| 8,237,909 B2 * | 8/2012 | Ostreko | B60R 1/12 349/1 |
| 8,339,526 B2 * | 12/2012 | Minikey, Jr. | B60R 1/12 349/11 |
| 8,411,245 B2 | 4/2013 | Lee et al. | |
| 8,564,662 B2 * | 10/2013 | Busch | B60R 1/00 348/148 |
| 8,842,176 B2 * | 9/2014 | Schofield | B60R 1/00 348/113 |
| 2002/0015214 A1 | 2/2002 | Nishikitani et al. | |
| 2010/0201816 A1 * | 8/2010 | Lee | B60R 1/12 348/148 |
| 2015/0085337 A1 * | 3/2015 | Lee | G02B 27/0149 359/267 |
| 2015/0277203 A1 * | 10/2015 | VanderPloeg | B60R 1/088 349/113 |

\* cited by examiner

VEHICLE DISPLAY COMPRISING FOCAL DISTANCE CORRECTION FEATURE

CROSS REFERENCE TO RELATED APPLICATION

This application claims priority to and the benefit under 35 U.S.C. § 119(e) of U.S. Provisional Patent Application No. 62/328,342, filed on Apr. 27, 2016, entitled "VEHICLE DISPLAY COMPRISING FOCAL DISTANCE CORRECTION FEATURE," the entire disclosure of which is hereby incorporated herein by reference.

TECHNOLOGICAL FIELD

The present invention generally relates to display devices for vehicles and more particularly to display devices configured to provide an improved focal distance.

SUMMARY OF THE DISCLOSURE

According to one aspect of the present disclosure, a display apparatus for a vehicle is disclosed. The apparatus comprises a display panel retained in a housing and configured to display image data on a display surface in a display direction. The apparatus further comprises a focal distance correction feature disposed in front of the display surface in the display direction. The focal distance correction feature is configured to project the image data at a projected distance behind the display surface relative to the display direction such that the image data appears to originate from behind the display surface.

According to another aspect of the present disclosure, a display apparatus for a vehicle is disclosed. The display apparatus comprises a display panel, a housing, an adjustment mechanism, and a focal distance correction feature. The display panel is configured to display image data on a display surface in a display direction. The housing is in connection with the vehicle and configured to retain the display panel. The adjustment mechanism is configured to simultaneously adjust a display angle of the display panel and selectively activate the display of the image data. The focal distance correction feature is disposed in front of the display surface in the display direction. The focal distance correction feature comprises a magnifying lens in connection with the housing. The magnifying lens is configured to project the image data at a projected distance behind the display surface relative to the display direction such that the image data appears to originate from behind the display surface.

According to yet another aspect of the present disclosure, a display system for a vehicle is disclosed. The system comprises a control circuit in communication with at least one image sensor configured to capture image data of a scene rearward of the vehicle and a display apparatus. The display apparatus comprises a display panel, a housing, an adjustment mechanism, and a focal distance correction feature. The display panel is in communication with the control circuit configured to display the image data on a display surface in a display direction. The housing is in connection with the vehicle and configured to retain the display panel. The adjustment mechanism is configured to adjust a display angle of the display panel and selectively activate the display of the image data. The focal distance correction feature is disposed in front of the display surface in the display direction. The correction feature comprises a magnifying lens in connection with the housing. The magnifying lens is configured to project the image data at a projected distance behind the display surface relative to the display direction such that the image data appears to originate from behind the display surface.

These and other features, advantages, and objects of the present invention will be further understood and appreciated by those skilled in the art by reference to the following specification, claims, and appended drawings.

DETAILED DESCRIPTION

Figure 1:
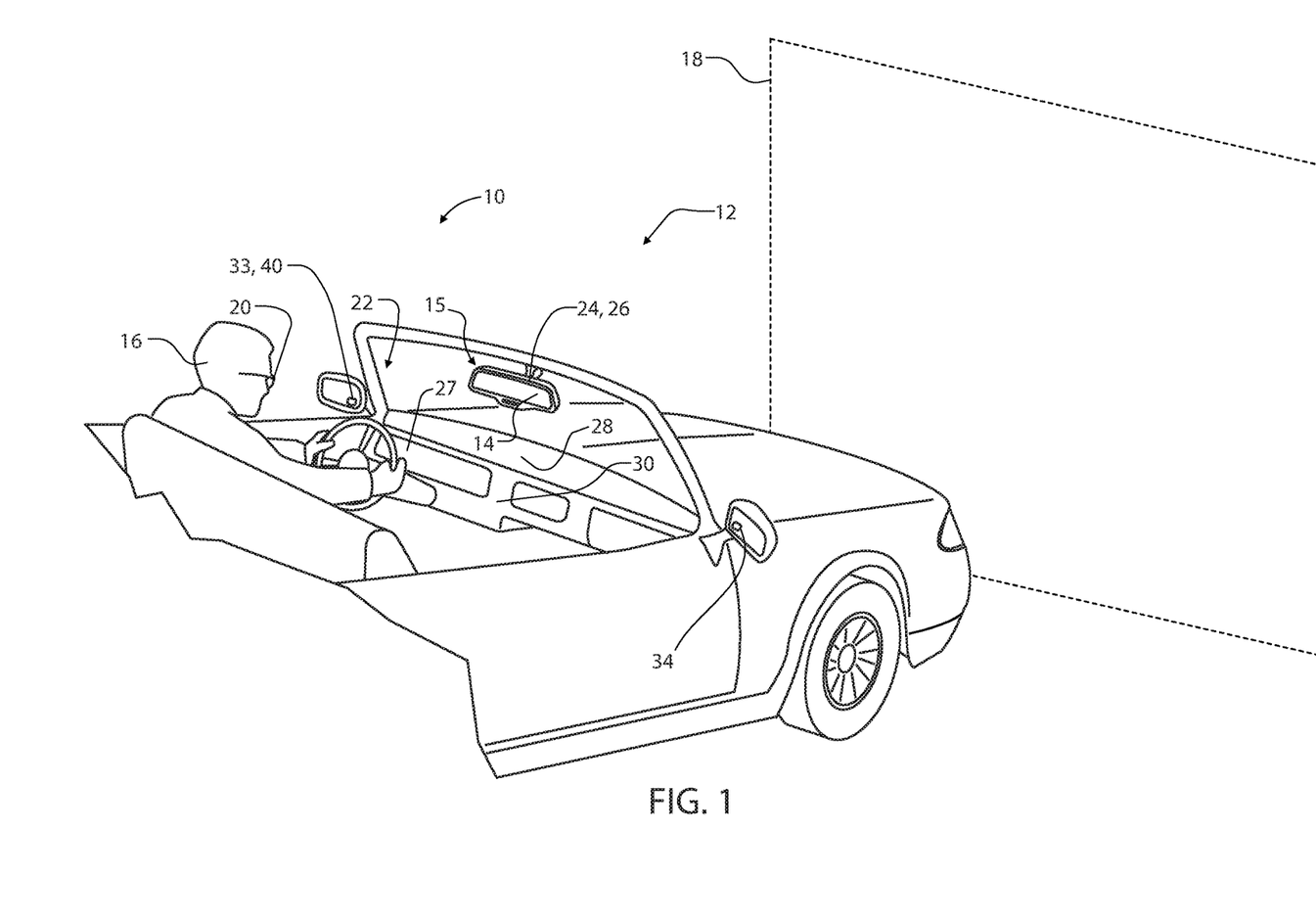
FIG. 1 is a projected view demonstrating a display system of a vehicle.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of a display, and the term "rear" shall refer to the surface of the element further from the intended viewer of the display. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, the disclosure provides for a display system 10 for a vehicle 12. The display system 10 may be operable to display image data on a display screen 14. In some embodiments, the display system 10 may comprise a focal distance correction feature 15 configured to adjust an apparent focal distance of the image data on the display screen 14 relative to an occupant 16 of the vehicle 12. The focal distance correction feature 15 may provide for relief of one or more forms of ocular strain, blurriness, and/or other various issues that may be associated with visual accommodation. In this way, the display system 10 may provide for an improved viewing experience of the display screen 14.

Visual accommodation is the process by which eyes focus on objects at various distances. For example, accommodation occurs when changing focus from a nearby object (e.g., the display screen 14) to a far off object in a distant region 18. The amplitude or effective accommodation of humans typically declines with age and may further be complicated by various additional visual irregularities. For example, various visual disorders including, but not limited to, latent hyperopia, myopia, presbyopia, and pseudomyopia may be related to or have adverse effects that can further exacerbate issues with accommodation. Some of these visual disorders may be treated with corrective lenses 20, but such treatments may further compound the issues related to accommodation. In order to limit the visual strain related to accommodation and related issues, the disclosure provides for the focal distance correction feature 15 configured to adjust the apparent focal distance of the display screen 14.

As demonstrated in FIG. 1, the display screen 14 may be located in a passenger compartment 22 of the vehicle 12 nearby the occupant 16. Accordingly, one or more issues in accommodation may be apparent when the occupant 16 adjusts focal distance from the nearby display screen 14 to the distant region 18. For example, one or more images shown on the display screen 14 of the display system 10 may appear blurred when viewed after looking at the distant region 18. Such issues may not typically be associated with conventional rearview mirrors (e.g., reflective mirrors without video displays) because the objects in the mirror appear to have a similar focal distance to objects in the distant region 18. Accordingly, the reflected scenes demonstrated in conventional mirrors may already appear to have a focal distance similar to that of the far off region 18.

Difficulties adjusting between the distant region 18 and nearby objects in the passenger compartment 22 may be more prevalent for older occupants 16 or operators of the vehicle 12. Due to a gradual loss of accommodation, older individuals may commonly have greater difficultly changing focus from the distant region 18 to the nearby objects (e.g., objects in the passenger compartment 22). As discussed herein, nearby objects may correspond to objects within approximately 1 m of the occupant 16. The distant region 18 may correspond to distances greater than 2 m from the occupant 16. Accordingly, the occupant 16 may face challenges of eye strain as well as magnification correction when viewing nearby objects in the passenger compartment 22 while operating the vehicle 12.

The disclosure may provide for the display system 10 that incorporates the focal distance correction feature 15 to limit a difference in a focal distance between the display screen 14 and one or more of far off objects in the distant region 18. In this way, the display system 10 may provide for improved visibility of a scene rearward from the vehicle 12 and limit eye strain that may otherwise result from adjustment in focal distance from the display screen 14 to the distant region 18.

As discussed herein, the display system 10 may be configured to capture and display image data on the display screen 14. The image data may correspond to one or more scenes that may typically be visible in a rearview mirror. In some embodiments, the display system 10 may provide for the display of panoramic image data captured by one or more cameras or imaging devices on the display screen 14. Accordingly, the disclosure provides for various embodiments of the display system 10, some of which are described in detail in the following description.

In an exemplary embodiment, a display apparatus 24 of the display system 10 may be incorporated in an interior rearview assembly 26. The display apparatus 24 may be mounted or otherwise attached to a vehicle 12 in a variety of locations. For example, the display apparatus 24 may be integrated into a gauge cluster 27, a dashboard 28, and/or a center stack 30 (e.g., infotainment center). The display apparatus 24 may also be located or in connection with various portions of the vehicle 12. For example, the display apparatus 24 may be mounted to a visor, a windshield, a door panel, a headliner, or a variety of vehicle components. In some embodiments, the display apparatus 24 may be incorporated in a side mirror of the vehicle 12.

Figure 2:
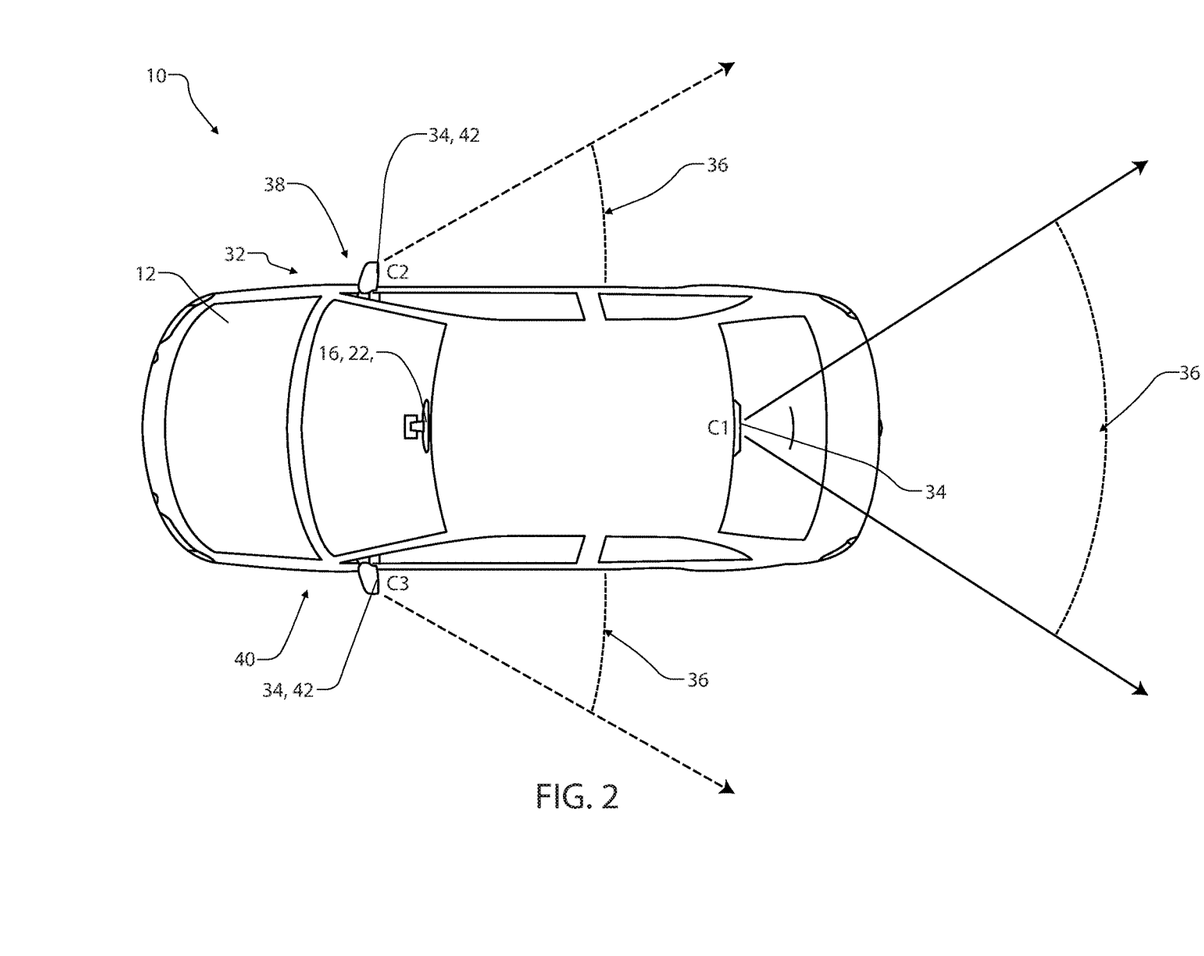
FIG. 2 is an elevational view of a vehicle demonstrating an imaging apparatus of a vehicle.

Referring now to FIG. 2, a diagram of an imaging apparatus 32 of the vehicle 12 is shown. In an exemplary embodiment, at least one image sensor 34 of the imaging apparatus 32 may correspond to a first image sensor C1, a second image sensor C2, and/or a third image sensor C3. Each of the image sensors 34 may have a field of view 36 focusing on an environment proximate the vehicle 12. In the various implementations discussed herein, the image sensors C1-C3 may be implemented to provide views of the environment proximate the vehicle 12 that may be displayed on the display screen 14 or any form of display device.

The image sensors 34 may be arranged in various locations on the vehicle 12. In an exemplary embodiment, the image sensors 34 may be arranged such that each of a plurality of fields of view 36 of the image sensors C1-C3 is configured to capture a significantly different portion of the surrounding environment. Each of the image sensors 34 may comprise any form of device configured to capture image data, for example, Charge Coupled Device (CCD), Complementary Metal Oxide Semiconductor (CMOS) image sensors, etc. Though three image sensors C1, C2, and C3 are discussed in reference to the present implementation, the number of image sensors may vary based on the specifications of the particular image sensors and/or a desired number or range of the field of view 36 for the display system 10.

In an exemplary embodiment, the image sensors C1, C2, and C3 are disposed on the vehicle 12 and oriented such that each field of view 36 of the image sensors 34 is directed toward a substantially different region. A first image sensor C1 may be disposed centrally on a rear facing portion of the vehicle 12 proximate a tailgate or similar area of the vehicle 12. In some embodiments, the image sensor C1 may be disposed proximate a rear-bumper and/or a center high mount stop light (CHMSL). A second image sensor C2 and a third image sensor C3 may be disposed on a passenger's side 38 and a driver's side 40 of the vehicle 12, respectively. The second image sensor C2 and the third image sensor C3 may be configured to capture image data corresponding to the environment proximate the side regions of the vehicle 12.

In some implementations, the second image sensor C2 and the third image sensor C3 may be disposed in side mirrors 42 of the vehicle 12. The image sensors C2 and C3, in combination with the first image sensor C1, may be configured to capture image data corresponding to a rearward-directed region relative the forward direction of the vehicle 12. In some embodiments, the image sensors 34 may be configured to capture an increased or decreased viewing angle depending on the particular application.

Figure 5:
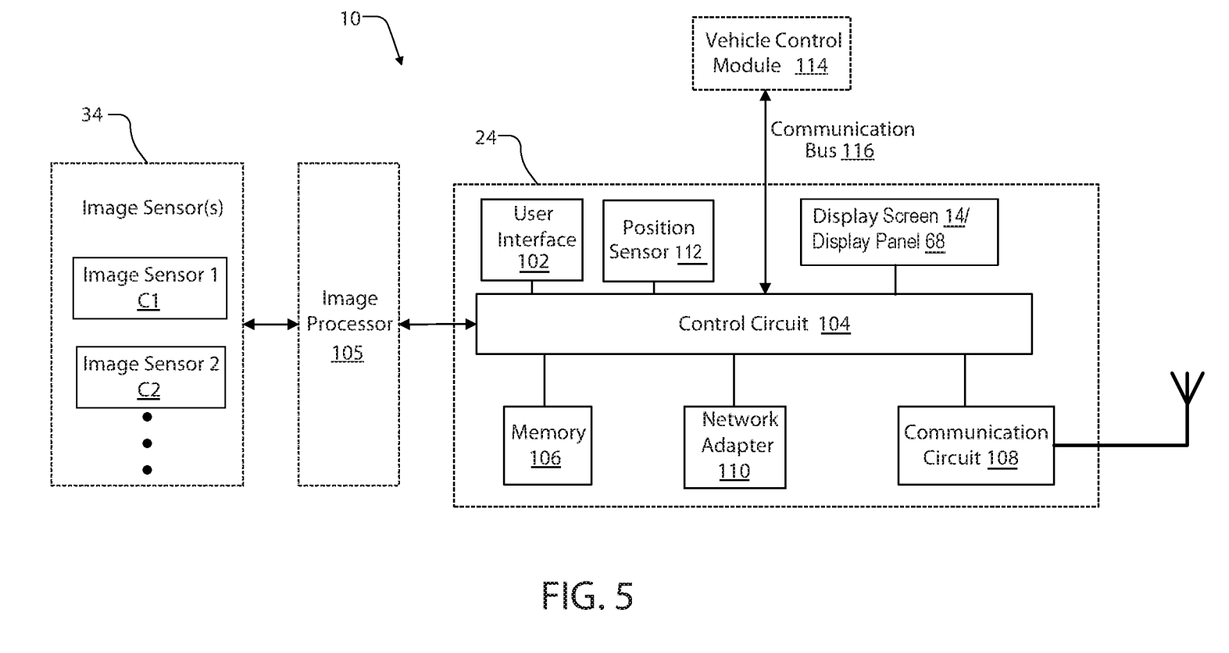
FIG. 5 is a block diagram of a display system in accordance with the disclosure.

As discussed further in reference to FIG. 5, the image sensors 34 may be in communication with one or more processors (e.g., an image processor 105) configured to process image data from each of the fields of view 36 captured by the image sensors 34. The processor may be configured to process the image data for display on the display screen 14 such that the operator or occupant 16 can view the image data on the display apparatus 24. The display apparatus 24 may further comprise the focal distance correction feature 15 to limit an apparent difference in the focal distance between the display screen 14 and one or more of far off objects in the distant region 18. In this configuration, the disclosure provides for a display system 10 configured to limit a range of accommodation of the occupant 16. Though discussed primarily in reference to the interior rearview assembly 26, the display system 10 may be utilized in various portions of the vehicle (e.g., a vehicle console, gage cluster, side mirrors, etc.). As such, the disclosure provides for various embodiments of vehicle displays that may be utilized for a variety of applications.

Figure 3A:
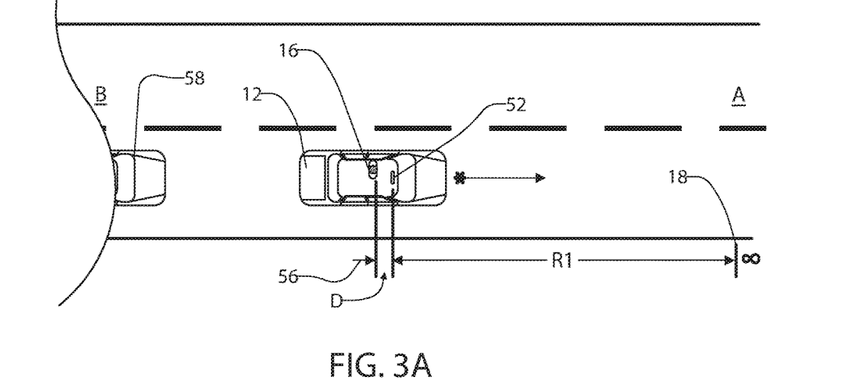
FIG. 3A is a schematic view demonstrating a range of accommodation for an occupant viewing a display apparatus.
Figure 3B:
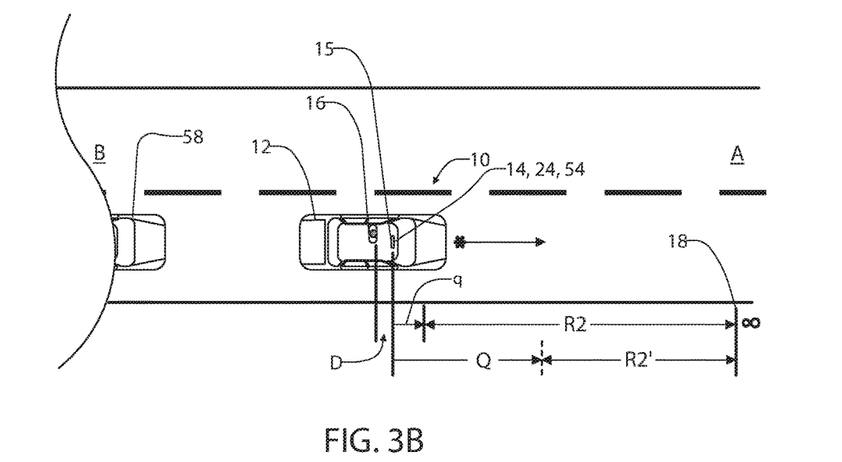
FIG. 3B is a schematic view demonstrating a range of accommodation for an occupant viewing a display apparatus equipped with a focal distance correction feature.

Referring now to FIGS. 3A and 3B, schematic diagrams of the vehicle 12 (e.g., the equipped vehicle 12 for clarity) comprising a first display apparatus 52 and a second display apparatus 54 are shown, respectively. The first display apparatus 52 may correspond to a rearview display device that is not equipped with a focal distance correction feature 15. As discussed herein, a display device may correspond to a device comprising a display screen (e.g., the display screen 14) configured to display image data captured by the at least one image sensor 34. The second display apparatus 54 may correspond to the display apparatus 24 comprising the focal distance correction feature 15 of the display system 10. The first display apparatus 52 and the second display apparatus 54 are discussed to demonstrate the effects of the focal distance correction feature 15, and, as such, like elements of the display apparatuses are like numbered for clarity.

As shown in FIG. 3A, the first display apparatus 52 demonstrates a first range of accommodation R1 extending from a display distance D of the display screen 14. The display distance D is the distance from the occupant 16 to the display apparatus 52. The first range of accommodation is the distance from the first display apparatus 52 to one or more far off objects in the distant region 18. The distant region 18 may correspond to a typical focal length of the occupant 16 while operating the vehicle. For the first display apparatus 52 without the focal distance correction feature 15, the occupant 16 may have to adjust focus from a first distance 56 of the display screen 14 at approximately 1 m or less from the occupant 16 to the distant region 18 that may be greater than 5 m from the occupant 16. The distant region 18 may generally correspond to a distance greater than 4 m from the occupant 16 and extend to an infinite focal distance ∞.

The infinite focal distance ∞ may correspond to a focal distance at which light rays striking a lens appear as parallel rays rather than diverging rays. For practical description as it relates to the display system 10 of the present disclosure, the infinite focal distance ∞ may correspond to a distance greater than 20 m from the occupant 16. Common focal distances for operating the vehicle 12 are denoted as region A for objects located in a forward region and region B for objects located in the rearward region B relative the vehicle 12. Region B may correspond to a location of a trailing vehicle 58.

As demonstrated in FIG. 3A, the occupant 16 may be required to adjust focus from the display screen 14 of the first display apparatus 52 at approximately less than 1 m to a distance exceeding 2 m. While the ability of the occupant 16 to adjust focus from the display screen 14 to the distant region 18 may vary based on the age or other factors, the adjustment of focus from the display screen 14 of the first display apparatus 52 may cause significant eye strain for some occupants 16. Accordingly, without the focal distance correction feature 15, the first display apparatus 52 may cause discomfort due to the first range of accommodation R1 extending from a viewing surface of the display screen 14 to the distant region 18.

Referring now to FIG. 3B, the second display apparatus 54 demonstrates a second range of accommodation R2 extending from beyond the display screen 14 of the second display apparatus 54 relative the occupant 16. As demonstrated, the focal distance correction feature 15 may be configured to adjust the focal distance away from the operator (e.g., the occupant 16) by a projected image distance q. The projected image distance q may provide for the second range of accommodation R2 to be less than the first range of accommodation R1. Additionally, the projected image distance q may provide for a perceived image distance Q that appears to extend further beyond the display distance D of the display screen 14 to provide a perceived second range of accommodation R2'.

As further discussed herein, the projected image distance q may provide for a display distance to appear to be extended from the occupant 16. Though the extended focal distance from the occupant may be relatively small, the perceived change in distance and decreased strain related to accommodation may be significantly improved. For example, the results of some tests of the distance correction feature 15 demonstrated that a perceived improvement in the range of accommodation (e.g., from R1 to R2) may be significantly greater than the proportional change in distance between the first range of accommodation R1 and the second range of accommodation. Accordingly, the distance correction feature 15 may provide for an unforeseen benefit in that the perceived relief in eye strain due to accommodation may exceed the proportional difference expected as a result of the comparably small change in the range of accommodation from R1 to R2.

Figure 4:
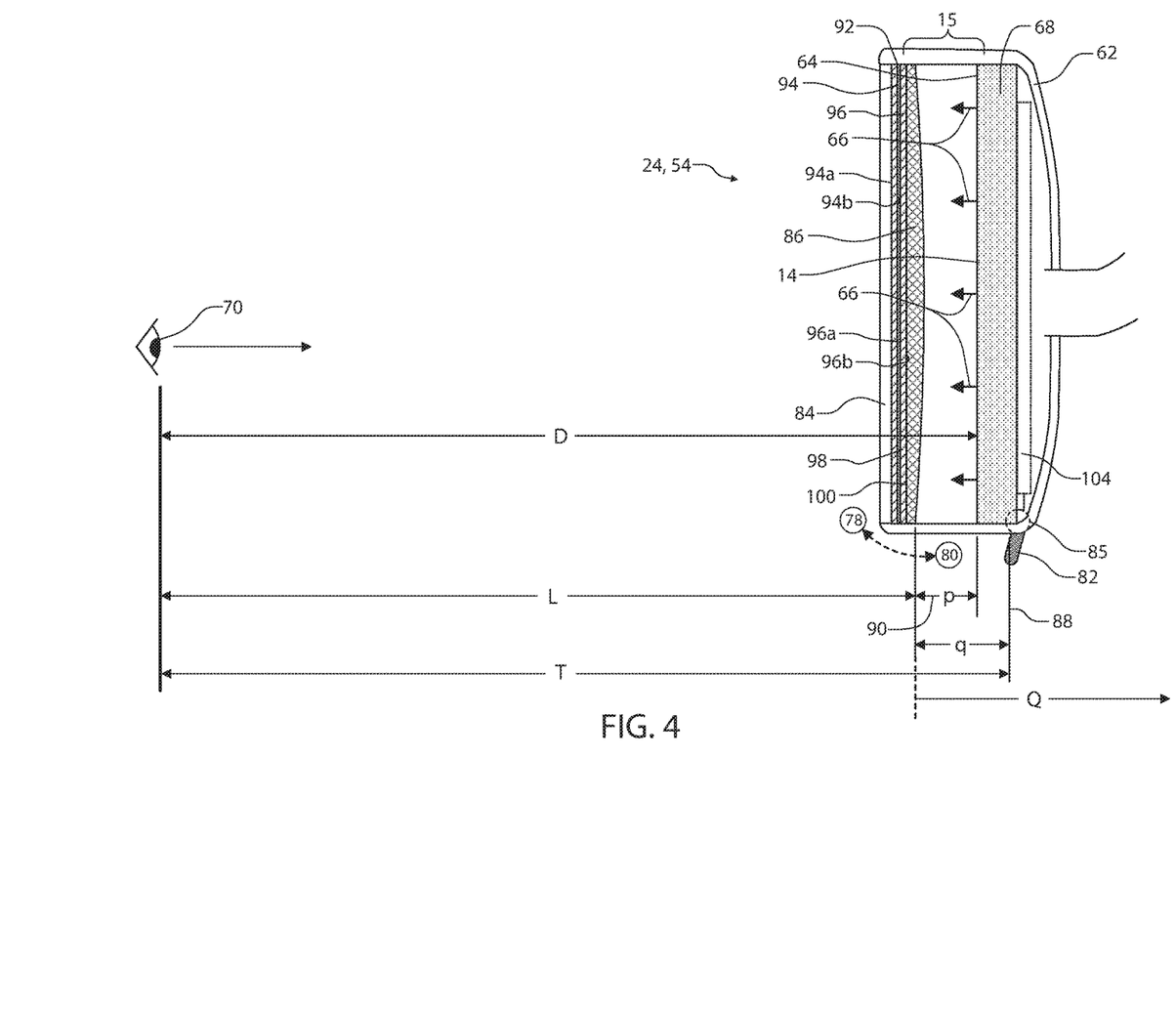
FIG. 4 is a cross-sectional side view of a display apparatus demonstrating a magnifying lens of a focal distance correction feature.

Further details demonstrating a relationship of the projected image distance q and other aspects of the focal distance correction feature 15 are discussed in reference to FIG. 4. The distances of the second range of accommodation R2 as well as the projected image distance q and other dimensional characteristics discussed herein may not be to scale as may be apparent from the detailed description. Such variations in scale are intended to ensure that the dimensional characteristics are visible in the associated figures. In this way, the relationships of the various dimensional characteristics may be apparent.

Referring now to FIG. 4, a side cross-sectional view of the display apparatus 24 of the display system 10 is shown demonstrating the focal distance correction feature 15. Accordingly, the display apparatus 24 may correspond to the second display apparatus 54 discussed in reference to FIG. 3B. As demonstrated, the display apparatus 24 may comprise the display screen 14 disposed in a housing 62, which may be configured to connect to the windshield of the vehicle 12. In this configuration, the occupant 16 of the vehicle 12 may view the display screen 14 at the projected image distance q. Accordingly, the display apparatus 24 may alleviate accommodation related issues associated with utilizing the display apparatus 24 when operating the vehicle 12.

The display screen 14 may form a display surface 64 configured to emit light corresponding to the image data captured by the at least one image sensor 34. In this configuration, the display surface 64 may define a display direction 66 directed outward from the display surface 64 and a display panel 68 of the display screen 14. As discussed herein, the display apparatus 24 may further comprise the focal distance correction feature 15 configured to limit a range of accommodation experienced by a viewer 70 (e.g., the occupant 16). The focal distance correction feature 15 may limit a perceived range of accommodation by projecting the image data at the projected image distance q behind the display surface 64 relative to the display direction 66. In this configuration, the image data may appear to originate from behind the display surface 64.

The display screen 14 may correspond to a display panel 68 or pixel array of various types. For example, the display panel 68 may correspond to a liquid crystal display (LCD), a plasma display, an organic light emitting diode (OLED) display, a field emission display (FED) panel, or various other displays. In some embodiments, the display apparatus 24 may correspond to a bi-modal display configured to switch from a reflective rearview mirror in a first position 78 to a video display configured to display image data on the display screen 14 in a second position 80. Accordingly, the display apparatus 24 may be configured to selectively activate the display panel 68 in response to a lever mechanism 82 or an adjustment mechanism adjusting a position of a partially reflective, partially transmissive element 84.

In some embodiments, the lever mechanism 82 may be configured to actuate a bi-modal switch 85 of at least one processor or control circuit 104 of the display apparatus 24. When the bi-modal switch 85 is actuated, the display panel 68 is either activated or deactivated and the position of the partially reflective, partially transmissive element 84 pivots to provide for a bi-modal operation of the display apparatus. In such embodiments, the partially reflective, partially transmissive element 84 may correspond to a glass element or prism element having a prism-type construction with a varying thickness from top to bottom. Accordingly, based on a position of the partially reflective, partially transmissive element 84, the display apparatus 24 may adjust a display angle of the function as a bi-modal device acting as a mirror in the first position 78 and a video or digital display in the second position 80.

The partially reflective, partially transmissive element 84 may pivot to adjust a display angle between approximately 2 degrees and 7 degrees along the broken line extending from the first position 78 to the second position 80. Accordingly, the lever mechanism 82 may be configured to arrange the element 84 and the corresponding display angle in the first position 78 configured in a reflective arrangement such that the display apparatus 24 functions as a conventional mirror with the display panel 68 deactivated. Additionally, the lever mechanism 82 may be configured to arrange the element 84 in the second position 80 configured in a transmissive arrangement such that the display apparatus 24 may function as a video display with the display panel 68 activated. Further details describing the display mirror are discussed in the following references, which are commonly owned and incorporated herein by reference in their entireties: U.S. Pat. No. 9,575,315 filed Sep. 24, 2014, entitled "Display Mirror Assembly;" and U.S. Pat. No. 9,834,146 filed on Apr. 1, 2015, entitled "Automatic Display Mirror Assembly."

When arranged in the second position 80 or the transmissive arrangement, the display apparatus 24 may be configured to display image data on the display screen 14. The image data may be augmented to change the focal distance of the image data displayed on the display screen 14 via the focal distance correction feature 15. The focal distance correction feature 15 may comprise a magnifying lens 86 configured to provide for the projected image distance q to adjust the apparent focal distance of the image data beyond the display distance D. In this configuration, the display apparatus 24 may limit a range of accommodation.

As discussed previously in reference to FIG. 3B, the display apparatus 24 may be configured to provide for the second range of accommodation R2 or a decreased range of accommodation. The second range of accommodation R2 may be limited by utilizing the magnifying lens 86 to adjust the focal distance of the display screen 14. For example, Eq. 1 demonstrates the relationship of the magnifying lens 86 having a focal length f, an object distance p between the magnifying lens 86 and the display screen 14, and a projected distance q of the apparent origin of the image data relative to the magnifying lens 86.

$$1/f = 1/p - 1 - q \qquad \text{(Eq. 1)}$$

Eq. 2 demonstrates Eq. 1 manipulated to solve for the projected distance q.

$$q = \frac{1}{1/p - 1/f} \qquad \text{(Eq. 2)}$$

With the projected distance q, the display apparatus 24 may be configured to manipulate the image data from the display screen 14 such that the image data appears to be displayed at the projected distance q. In this configuration, the second range of accommodation R2 may be decreased by the focal distance correction feature 15. In an exemplary embodiment, the projected distance q may only correspond to a small distance of approximately less than 150 mm. Accordingly, the difference between the object distance p and the projected distance q may be less than 100 mm. In this configuration, though the projected image data may be projected to a projected display surface 88 less than 100 mm beyond the display screen 14, the perceived image distance Q may appear to extend significantly beyond the display screen 14. In fact, experimental data illustrates that the perceived image distance Q may appear to significantly limit the range of accommodation R2 to provide an appearance of the image data on the display screen 14 that is very similar to a conventional, reflective rearview mirror device.

As discussed herein, the projected image distance q may provide for a perceived image distance Q that appears to extend beyond the display distance D. The display distance D may therefore be extended from the viewer 70 by a distance denoted as the difference between the object distance p and the projected distance q. This may provide for a total viewing distance T as the sum of a lens distance L extending from the viewer 70 to the magnifying lens 86 plus the projected distance q. In this way, the display apparatus 24 provides for the viewing distance to be extended from the display distance D to a total viewing distance T.

In some embodiments, the display apparatus 24 has further been demonstrated to significantly limit the perceived image distance Q by providing for a projected image distance q that is only slightly greater than the object distance p. In a particular example, a focal length of the magnifying lens 86 was selected to be 315 mm having an F-number of approximately 1. Additionally, the object distance p, which may correspond to a gap 90 from the center of the magnifying lens 86 to the display surface 64 was approximately 15 mm. Based on Eq. 2, the resulting projected distance q was only 15.75 mm, and the resulting projected display surface 88 mathematically was only 0.75 mm beyond the display surface 64 of the display screen 14.

Though the calculated distance of the projected display surface 88 was less than 1 mm behind the display screen 14, the test data demonstrated a significant perceived improvement that reduced a range of accommodation and alleviated eye strain when viewing the display apparatus 24.

In reference still to the example comprising the projected display surface 88 less than 1 mm behind the display screen 14, the perceived difference in the second range of accommodation R2 was reported to be much greater than the calculated projected distance q. Additionally, the reduction in eyestrain due to accommodation was also reported to be significantly reduced. The results of limiting the perceived accommodation and variation in focal distance associated with utilizing the display panel 68 was unexpected considering the vast difference between the perceived experience of viewing the display screen 14 with the focal distance correction feature 15 and the theoretical difference in focal distance. Though the perceived difference may be challenging to quantify, the effect of the specific example listed having the magnifying lens 86 with the focal length of 315 mm and the object distance p of 15 mm provided the illusion of a perceived image distance Q increasing by 1 meter or more. Accordingly, the display apparatus 24 may provide for a significant reduction in the perceived range of accommodation.

Still referring to FIG. 4 in some embodiments, the display apparatus 24 may comprise an electro-optic element 92. For example, the electro-optic element 92 may comprise an electrochromic medium, which includes at least one solvent, at least one anodic material, and at least one cathodic material. Both of the anodic and cathodic materials may be electroactive and at least one of them may be electrochromic. The term "electroactive" as discussed herein may correspond to a material that undergoes a modification in its oxidation state upon exposure to a particular electrical potential difference. Additionally, the term "electrochromic" may correspond to a material that exhibits a change in its extinction coefficient at one or more wavelengths upon exposure to a particular electrical potential difference. Electrochromic components, as described herein, may include materials having color or opacity affected by electric current, such that when an electrical current is applied to the material, the color or opacity changes from a first phase to a second phase.

The electro-optic element 92, as disclosed herein, may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use in Electrochromic Devices"; U.S. Pat. No. 6,519,072 entitled "Electrochromic Device"; and International Patent Publication Nos. Wo 98/42796 entitled "Electrochromic Polymeric Solid Films, Manufacturing Electrochromic Devices Using Such Solid Films, And Processes For Making Such Solid Films and Devices," and WO 99/02621 entitled "Electrochromic Polymer System," which are herein incorporated by reference in their entirety.

The electro-optic element 92 may comprise a first element 94 and a second element 96. Configured to retain the electro-optic medium 98. The first element 94 may comprise a first side 94a and a second side 94b. The second element 96 may comprise a third side 96a and a fourth side 96b. The magnifying lens 86 may correspond to a plano-convex magnifying lens having a focal distance from approximately 150 mm and 400 mm. In this configuration, a planar surface 100 of the magnifying lens 86 may be optically bonded to the fourth surface 96b of the electro-optic element 92. In some embodiments, one or more layers corresponding to the partially reflective, partially transmissive element 84, the magnifying lens 86, and/or the electro-optic element 92 may be coated with one or more anti-reflective coatings. Such anti-reflective coatings may have a reflectance of 0.5% or less.

Referring now to FIG. 5, a block diagram of the display system 10 is shown. The display system 10 may include a user interface 102 in the form of one or more buttons in communication with a control circuit 104. An exemplary embodiment of the display apparatus 24 may incorporate the elements shown in the dashed line box designated as the display apparatus 24. In some embodiments, the user interface 102 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action.

The display system 10 may comprise the display apparatus 24. The display apparatus 24 may comprise the display panel 68. The display panel 68 may be a variety of display types. For example, the display panel 68 may correspond to a liquid crystal display (LCD), a plasma display, an organic light emitting diode (OLED) display, a field emission display (FED) panel, or various other displays. The display apparatus 24 may further incorporate a speaker, haptic feedback device (e.g., vibration motor), LEDs, or other hardware component for providing an output.

The control circuit 104 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 104 may be a system on a chip (SoC) individually or with additional hardware components described herein. The control circuit 104 may further include memory 106 (e.g., random access memory, read only memory, flash memory, hard disk storage, flash memory storage, solid state drive memory, etc.). In further embodiments, the control circuit 104 may function as a controller for one or more hardware components included in the display system 10. For example, the control circuit 104 may function as a controller for a touchscreen display or other operator input device, a controller for a transceiver, transmitter, receiver, or other communication device (e.g., implement a Bluetooth communications protocol).

In some embodiments, the control circuit 104 may be configured to receive inputs from the user interface 102. The inputs may be converted into control signals that may be identified and utilized to output one or more control signals and/or transmit data. In this configuration, the display system 10 may communicate (e.g., send and/or receive signals and/or data) to control various functions of the display screen 14 or settings or functions of the vehicle 12.

The memory 106 may be used to facilitate the functions of the display system 10 as described herein. Memory 106 may include computer code modules, data, computer instructions, or other information which may be executed by the control circuit 104 or otherwise facilitate the functions of the display system 10 described herein. For example, the memory 106 may include encryption codes, pairing information, identification information, device registry configurations, image augmentation information, occupant specific information, etc. The memory 106 and/or the control circuit 104 may facilitate the functions described herein using one or more programming techniques, data manipulation techniques, and/or processing techniques, such as algorithms, routines, lookup tables, arrays, databases, comparisons, instructions, etc.

The display system 10 may further comprise a communication circuit 108. The communication circuit 108 may correspond to a transceiver circuit or transmitter circuit coupled to the control circuit 104. The transceiver circuit may provide for the display system 10 to transmit and/or receive wireless communication signals. The wireless communication signals may be transmitted to or received from a variety of wireless devices (e.g., an original transmitter, a home electronic device, a mobile communications device, and/or a remote device).

The communication circuit 108 may be controlled by the control circuit 104. For example, the control circuit 104 may turn on or off the communication circuit 108; send data using the communication circuit 108; format information, an activation signal, control signal, and/or other signal or data for transmission via the communication circuit 108; or otherwise control the communication circuit 108. Inputs from the communication circuit 108 may also be received by the control circuit 104. For example, one or more settings of the display screen 14 may be received by the communication circuit 108 and stored in the memory 106 by the control circuit 104.

In some embodiments, the communication circuit 108 may include additional hardware such as processors, memory, integrated circuits, antennas, etc. The communication circuit 108 may process information prior to transmission or upon reception and prior to passing the information to the control circuit 104. In some embodiments, the communication circuit 108 may be coupled directly to the memory 106 (e.g., to store encryption data, retrieve encryption data, etc.). In further embodiments, the communication circuit 108 may include one or more transceivers, transmitters, receivers, etc. For example, the communication circuit 108 may include an optical transceiver, near field communication (NFC) transceiver, etc. In some embodiments, the communication circuit 108 may be implemented as a SoC.

The control circuit 104 may also be coupled to a network adapter 110, receivers, and/or transmitters. In some embodiments, the network adapter 110 may be configured to communicate with the image sensors 34. In some embodiments, the network adapter 110 may correspond to or include a cellular transceiver. In this configuration, the display system 10 may use the network adapter 110 and/or an additional transceiver (e.g., a cellular transceiver) to access the internet, other networks, and/or network hardware. In some embodiments, the display system 10 may access the internet, other networks, and/or network hardware through an intermediate device in communication with the display system 10, such as the mobile device.

In an exemplary embodiment, the network adapter 110 may be configured to send/receive data and/or control signals to a mobile device. The network adapter 110 may communicate via various wireless communication protocols. For example, communication protocols may include, but are not limited to, Bluetooth™ (e.g., a Bluetooth low energy (BLE), WiFi (IEEE 802.11), Zigbee, cellular, etc.), a wired interface and/or protocol (e.g., Ethernet, universal serial bus (USB), Firewire, etc.), or other communication connections (e.g., infrared, optical, ultrasound, etc.).

In some embodiments, the display system 10 may comprise a position sensor 112 configured to identify a position or orientation of the display apparatus 24 relative to a forward direction of the vehicle 12. The position sensor 112 may correspond to an electrical or electromechanical sensor (e.g., an encoder, potentiometer, proximity sensor, compass, gyroscope, etc.), and may be configured to identify an angle of the display apparatus 24 or the display screen 14 relative to the forward direction of the vehicle 12. In this way, the image processor 105 may be operable to process the image data to select a plurality of views to generate the image data based on the angle of the display screen 14.

The control circuit 104 may be in communication with a vehicle control module 114 via a communication bus 116 of the vehicle 12. The communication bus 116 may be configured to deliver signals to the control circuit 104 identifying various states of the vehicle 12. For example, the communication bus 116 may be configured to communicate an operating condition of the vehicle (e.g., the ignition is active, a gear selection, a lighting activation or setting, etc.), an ambient light level, a seat occupancy, a door ajar signal, driver/occupant identity or any other information or control signals that may be communicated via the communication bus 116. In this way, the control circuit 104 may communicate with the vehicle control module 114 to identify a variety of conditions and/or settings of the vehicle 12.

In some embodiments, the display system 10 may be incorporated in a display similar to those disclosed in the following references. Examples of display assemblies that may be utilized with the disclosure may include U.S. Pat. No. 6,572,233 entitled "Rearview display mirror," U.S. Pat. No. 8,237,909 entitled "Vehicular rearview mirror assembly including integrated backlighting for a liquid crystal display (LCD)," U.S. Pat. No. 8,411,245 entitled "Multi-display mirror system and method for expanded view around a vehicle," and U.S. Pat. No. 8,339,526 entitled "Vehicle rearview mirror assembly including a high intensity display," which are incorporated herein by reference in their entirety.

The following references may include various implementations for imager systems providing rearward facing panoramic views and are incorporated herein by reference in their entirety: U.S. Pat. No. 8,237,909 B2, entitled "Vehicle Rearview Mirror Assembly Including Integrated Backlighting for a Liquid Crystal Display (LCD), filed Feb. 6, 2009, by John B. Ostreko et al.; and U.S. Pat. No. 8,411,245, entitled "Multi-Display Mirror System and Method For Expanded View Around a Vehicle," filed Sep. 30, 2009, by Ethan J. Lee et al. Though the display system 10 in the various implementations disclosed herein is shown incorporated in a rearview display system, a display may similarly be incorporated in a vehicle forward center console, heads up display, or in any other location that may be visible to an operator or occupant of the vehicle 12.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A display apparatus for a vehicle comprising:
   a display panel configured to display image data on a display surface in a display direction;
   a housing in connection with the vehicle and configured to retain the display panel; and
   a focal distance correction feature disposed in front of the display surface in the display direction, wherein:
      the correction feature comprises a magnifying lens in connection with the housing;
      the housing is configured to position the magnifying lens approximately parallel to the display surface and form a gap between the display surface and the magnifying lens; and
      the magnifying lens is configured to project the image data at a projected distance behind the display surface relative to the display direction such that the image data appears to originate from behind the display surface, wherein the projected distance is less than 150 mm; and
   a partially reflective, partially transmissive element disposed in front of the magnifying lens in the display direction.

2. The display apparatus according to claim 1, wherein the gap is less than 50 mm.

3. The display apparatus according to claim 1, wherein the projected distance is less than 100 mm.

4. The display apparatus according to claim 1, wherein the projected distance is less than 50 mm.

5. The display apparatus according to claim 1, wherein the partially reflective, partially transmissive element is configured to transmit the light from the display panel in a first position and reflect a scene located rearward relative the vehicle in a second position.

6. The display apparatus according to claim 1, further comprising:
   an adjustment mechanism configured to simultaneously adjust a display angle of the display panel and selectively activate the display of the image data.

7. The display apparatus according to claim 6, wherein the adjustment mechanism selectively activates a bi-modal operation of the display apparatus.

8. The display apparatus according to claim 7, wherein the display apparatus is configured to reflect a scene rearward of the vehicle from the display apparatus in a first configuration, and display image data comprising the scene rearward of the vehicle on the display panel in the second configuration.

9. The display apparatus according to claim 1, further comprising:
   a prism element configured to transmit light corresponding to the image data, wherein the magnifying lens is configured to project light from the display panel through the prism element.

10. A display apparatus for a vehicle comprising:
    a display panel configured to display image data on a display surface in a display direction;
    a housing in connection with the vehicle and configured to retain the display panel;
    an adjustment mechanism configured to simultaneously adjust a display angle of the display panel and selectively activate the display of the image data;
    a prism element configured to transmit light corresponding to the image data; and
    a focal distance correction feature disposed in front of the display surface in the display direction, wherein the focal distance correction feature comprises a magnifying lens in connection with the housing, wherein the magnifying lens is disposed between the display panel and the prism element, and the magnifying lens is configured to project the image data at a projected distance behind the display surface relative to the display direction such that the image data appears to originate from behind the display surface.

11. The display apparatus according to claim 10, wherein the adjustment mechanism selectively activates a bi-modal operation of the display apparatus.

12. The display apparatus according to claim 11, wherein the display apparatus is configured to reflect a scene rearward of the vehicle from the display surface in a first configuration, and display image data comprising the scene rearward of the vehicle on the display panel in the second configuration.

13. The display apparatus according to claim 10, wherein the prism element is configured to reflect light corresponding to a scene rearward of the vehicle from the prism element in the first configuration.

14. The display apparatus according to claim 13, wherein the prism element is configured to transmit the light corresponding to the image data from the display panel in the second configuration.

15. The display apparatus according to claim 13, wherein the adjustment mechanism comprises a switch in communication with a control circuit of the display panel configured to selectively activate the display of the image data.

16. The display apparatus according to claim 10, wherein the housing is configured to position the magnifying lens approximately parallel to the display surface and form a gap between the display surface and the magnifying lens.

17. A display system for a vehicle comprising:
a control circuit in communication with at least one image sensor configured to capture image data of a scene rearward of the vehicle;
a prism element configured to transmit light corresponding to the image data;
a display apparatus comprising:
a display panel in communication with the control circuit configured to display the image data on a display surface in a display direction;
a housing in connection with the vehicle and configured to retain the display panel;
an adjustment mechanism configured to adjust a display angle of the display panel and selectively activate the display of the image data; and
a focal distance correction feature disposed in front of the display surface in the display direction, wherein:
the correction feature comprises a magnifying lens in connection with the housing; and
the magnifying lens is configured to project the image data at a projected distance behind the display surface relative to the display direction such that the image data appears to originate from behind the display surface, wherein the magnifying lens is configured to project the light from the display panel through the prism element, and wherein the prism element is configured to reflect light comprising the scene rearward of the vehicle from the display surface in a first configuration and display image data comprising the scene rearward of the vehicle on the display panel in the second configuration.

* * * * *